United States Patent [19]
Hall

[11] Patent Number: 5,297,885
[45] Date of Patent: Mar. 29, 1994

[54] HIGH STRENGTH EDGE JOINT WITH PROTECTED CORNER

[76] Inventor: Warren G. Hall, 407 Watts St., Durham, N.C. 27701

[21] Appl. No.: 117,548

[22] Filed: Sep. 7, 1993

Related U.S. Application Data

[63] Continuation of Ser. No. 776,583, Oct. 11, 1991, abandoned.

[51] Int. Cl.[5] ............................................. F16B 12/46
[52] U.S. Cl. ..................................... 403/231; 403/205; 403/268; 403/402; 403/403; 114/88; 114/357
[58] Field of Search ................ 114/355, 357, 359, 88; 403/205, 265, 266, 267, 268, 292, 295, 402, 403, 231; 428/414, 511, 121

[56] References Cited

U.S. PATENT DOCUMENTS

| | | | |
|---|---|---|---|
| 529,786 | 11/1894 | Godfrey . | |
| 1,289,308 | 12/1918 | Thornton . | |
| 2,183,017 | 4/1936 | Grant | 114/88 X |
| 2,700,357 | 1/1955 | Winter . | |
| 3,013,284 | 12/1961 | Crippin, Sr. | 9/6 |
| 3,040,687 | 6/1962 | Huet | 114/355 X |
| 3,074,448 | 1/1963 | Brown | 144/316 |
| 3,898,012 | 8/1975 | Gillin | 403/292 X |
| 4,078,959 | 3/1978 | Palfrey et al. | 428/121 X |
| 4,199,907 | 4/1980 | Bains et al. | 403/403 X |
| 4,556,592 | 12/1985 | Bannink | 403/267 X |

FOREIGN PATENT DOCUMENTS 2353684  5/1975  Fed. Rep. of Germany ...... 403/265

*Primary Examiner*—Randolph A. Reese
*Assistant Examiner*—Christopher J. Novosad
*Attorney, Agent, or Firm*—Richard E. Jenkins

[57] ABSTRACT

An edge joint particularly adapted for use in boat construction and furniture construction due to its high strength and aesthetically pleasing appearance due to the elimination of external structural reinforcements such as chine logs and hardened fillets. The high strength non-reinforced edge joint comprises two bilaminated plywood panels positioned together at an angle between about 60°-170°. Each panel defines a V-shaped groove along one side thereof so that one leg of each of the grooves is in contact with a corresponding leg of the other groove and the second legs of the grooves are spaced-apart so as to form an open cavity at the juncture of the panel. A cementitious material fills the cavity so as to form the edge joint as well as the protected outer corner thereof.

19 Claims, 3 Drawing Sheets

HIGH STRENGTH EDGE JOINT WITH PROTECTED CORNER

This is a continuation of co-pending application Ser. No. 07/776,583 filed on Oct. 11, 1991, now abandoned.

DESCRIPTION

1. Technical Field

The present invention relates to a high strength edge joint which does not require external structural reinforcement in the form of a chine log or a hardened fillet. More particularly, the present invention relates to an improved edge joint which is particularly well adapted for use in boats and furniture and which further provides a protected outer corner.

2. Related Art

Plywood and other modern laminates and sheet plastics represent remarkably strong and useful boatbuilding materials for hull construction. In theory, these materials allow ready construction of hulls shaped from multiple panels (called "hard chine" in boat design due to the hard edge where the panels join as opposed to "rounded bilge" construction which can be accomplished with the traditional plank-on-frame techniques). In addition, use of modern epoxies to provide effective barriers to water penetration has effectively eliminated the age-old problem of wood rot. However, "hard chine" plywood boat construction has been relatively limited in part because of the awkwardness of the joint between two panels of the laminate. The joint needs to be strong and rigid, and yet the angle of the joint needs to vary over the length of the joint.

The standard techniques for producing these joints usually depend on external structural reinforcement in the form of a longitudinal stringer inside the hull (termed "chine log" in boat building) to which the panels are attached or in the form of a hardened fillet (an epoxy filler covered and strengthened with fiberglass cloth). Adding to the difficulty of creating a durable joint is the problem that because one of the plywood edges is left exposed (open edge) and vulnerable to water saturation and easy chipping, a protective covering is usually required to prevent delamination (for example, fiberglass cloth is typically used for this protection in boatbuilding). These standard joints are aesthetically obtrusive because of the stringer or fillet on the inside of the hull and can be time-consuming to construct. The chine log, for example, requires hand planing of a continuously variable angle so that the plywood panels meet correctly to shape the hull.

Applicant is not aware of any plywood fabrication technique for marine construction using plywood panels (i.e., "hard chine" designs) that does not employ one of these two techniques or a variant of them for joining panels. Plywood does have other types of application in boatbuilding which involve treating plywood as simply a source of "planks" for traditional construction techniques (i.e., round bilge with frames and ribs called "lapstrake") or which involve the application of small pieces of plywood in thin veneers to form hulls of rounded shape (a process known as "cold molding").

The invention described and claimed hereinbelow is an edge joint and joining method that can be applied to designs that use plywood laminates or plastic panels in sheets to shape a boat hull (or other applications such as a piece of furniture) in "hard chine" designs. It improves joining by providing a novel edge joint for a rigid internal or embedded joint of variable angle with no obtrusive reinforcement. At the same time the novel joint protects the plywood edge and is simple and forgiving to fabricate.

DISCLOSURE OF THE INVENTION

A high strength non-reinforced edge joint with a protected corner comprising at least two panels positioned together so that the surface planes of the panels intersect at an angle between about 60°–170° and wherein the panels each defines a V-shaped groove having first and second spaced-apart legs along one side thereof. The first legs of the V-shaped grooves are in contact one with the other and the second legs of the grooves are spaced apart one from the other so as to form an open cavity at the juncture of the panels which is defined by the grooves within said adjacent panels and the open space between said second legs of said grooves. A cementitious material filling is provided in the cavity to form the edge joint as well as the protected corner thereof.

It is therefore an object of the present invention to provide an improved edge joint for use in boatbuilding and in other uses such as furniture construction which does not require an obtrusive external structural reinforcement such as a chine log or fillet.

It is another object of the present invention to provide an improved plywood edge joint which does not require an obtrusive reinforcement on the inside or outside thereof and which further provides for a protected outer corner.

It is yet another object of the present invention to provide an improved plywood edge joint which is strong and rigid and yet which does not require external reinforcement and does not leave an exposed plywood edge which is vulnerable to water saturation and easy chipping.

It is still another object of the present invention to provide a more aesthetically pleasing plywood edge joint which while strong and rigid requires less time-consuming labor to form than conventional plywood edge joints.

Some of the objects of the invention having been stated, other objects will become evident as the description proceeds, when taken in connection with the accompanying drawings.

DISCLOSURE OF THE INVENTION

Figure 1:
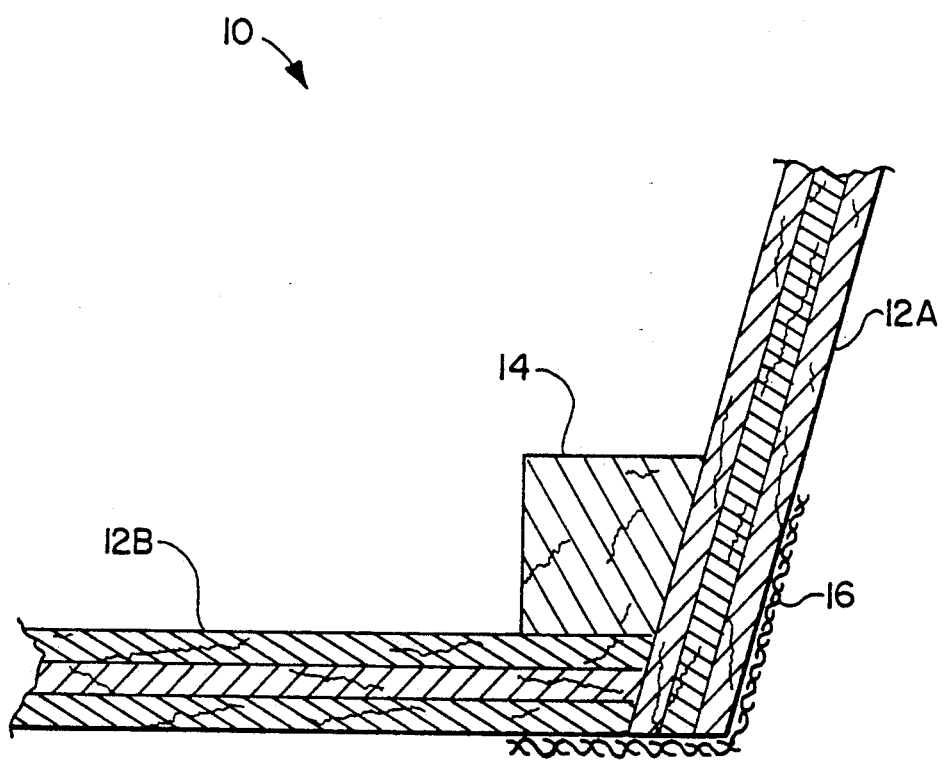
FIG. 1 is a vertical cross sectional view of a prior art plywood edge joint reinforced with a chine log.
Figure 2:
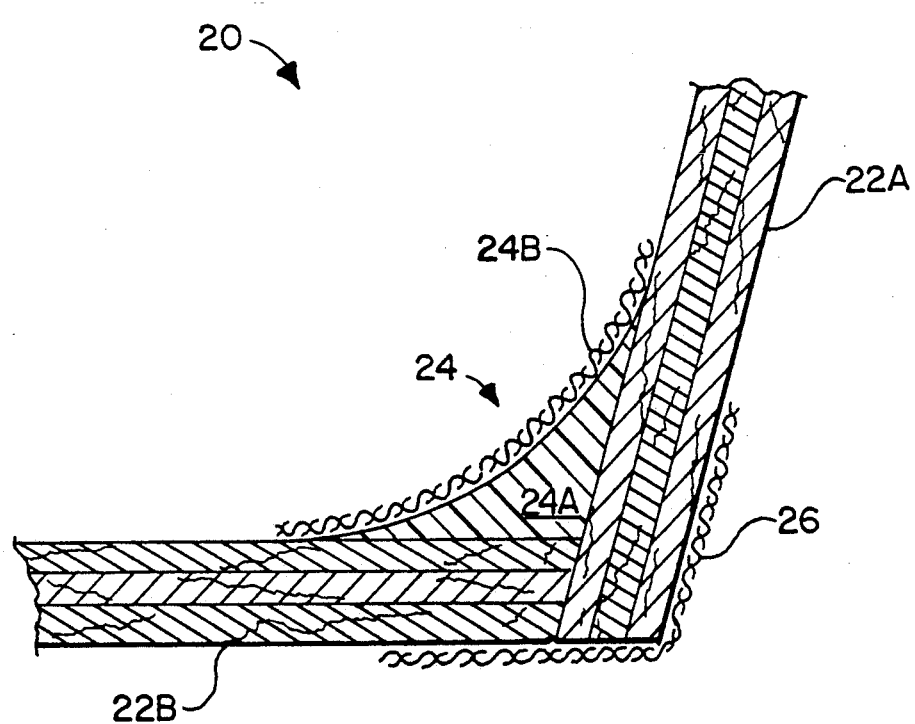
FIG. 2 is a vertical cross sectional view of a prior art plywood edge joint reinforced with a hardened fillet.

Referring now more specifically to the drawings, FIG. 1 shows a prior art edge joint 10 comprising two plywood panels 12A, 12B attached to a chine log 14 and utilizing a fiberglass cloth protective covering 16 to protect the exposed plywood edge of panel 12A. FIG. 2 shows a prior art edge joint 20 comprising two plywood panels 22A, 22B attached to hardened fillet 24 which comprises epoxy filler 24A covered and strengthened with fiberglass cloth 24B. A fiberglass cloth protective covering 26 is also provided to protect the exposed plywood edge of panel 22A.

Figure 3:
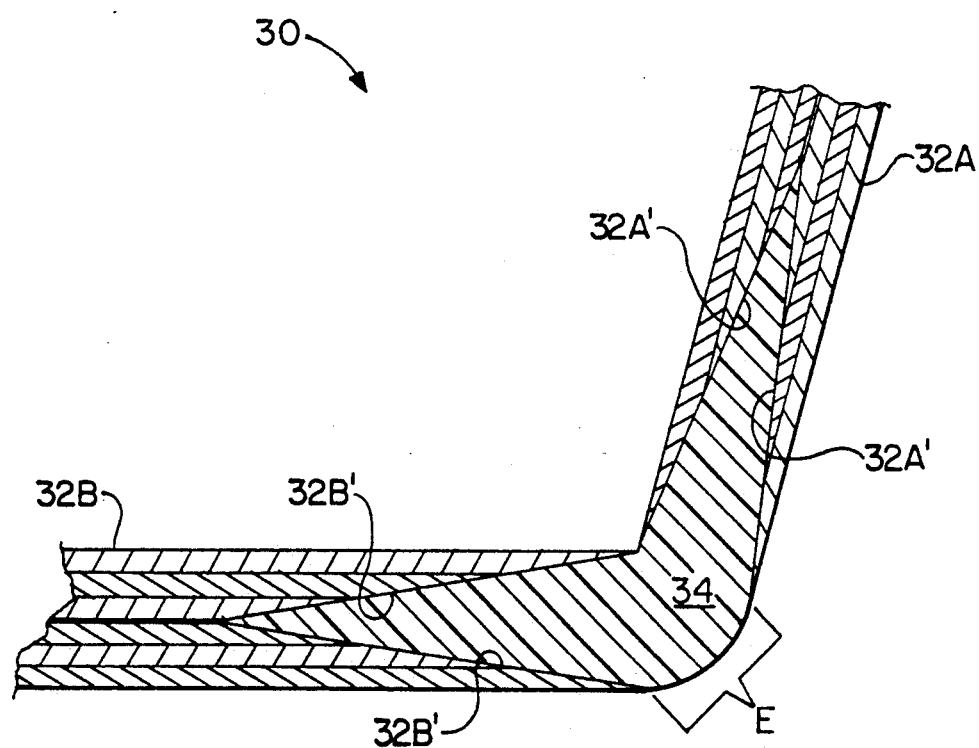
FIG. 3 is a vertical cross sectional view of one embodiment of the improved edge joint of the present invention.

The novel edge joint of the invention 30 is shown in FIG. 3 and the joint comprises three features: (1) bilaminate plywood panels 32A, 32B for each side of the joint; (2) sharply beveled internal edges 32A', 32B' within each panel 32A, 32B, respectively, to achieve a large surface area for bonding; and (3) a solid epoxy core 34 that locks the two panels in place and provides a protected epoxy corner E. Although assembly is achieved interdependently, the features are initially described individually in the following section, then methods of fabrication are discussed in specific detail.

First, panels 32A, 32B of the hull being joined at an edge are themselves each laminated from two thinner panels of half the thickness (which are bonded together with epoxy or other suitable cement material). The second feature of the joint is that at the edge to be joined, each of the half-panels is beveled inwardly (at a typical bevel ratio of 8:1) to expose large surface areas 32A', 32B' for effective bonding. However, the angle of the bevel can be adjusted to increase or decrease the strength of the joint as appropriate to the wood and bonding material being used. The facing bevels 32A', 32B' create elongated V-shaped spaces between their faces. Third, the V-shaped spaces of the two sets of half panels in apposition are filled with a continuous epoxy or suitable epoxy/composite mixture 34 which when hardened creates a solid joint to which each panel is strongly attached by virtue of the large bonding surface provided by the bevels. Thus, in cross section, the beveled arms of each panel enclose a solid epoxy or composite core that holds each panel rigidly. A strong and unobtrusive embedded joint or seam is thus achieved.

For appropriate thicknesses of plywood the epoxy joint 30 will be stronger and more rigid than the plywood, and the ratio of the bevels 32A', 32B' assures that the entire joint is also stronger than the plywood panels themselves. For greater thicknesses of plywood or where for a design requirement more rigidity is required, the internal seam 34 can be strengthened by addition of structural material such as fiberglass or carbon fiber to the epoxy.

Joint 30 has the advantage that the open edge E of the plywood is closed into the joint and completely sealed, and thus protected against water penetration and delamination. At the same time, because corner edge E of the joint is itself formed of solid epoxy or epoxy composite, there is protection of the softer wood by the hard epoxy edge. The two exterior panels 32A, 32B do not actually come together at the tips of their bevels, but are held apart during construction to allow for the radius of the intended corner E (see FIG. 3). The distance of this setback must be determined and tested for each particular combination of wood and bonding material, and joint 30 does not require the external application of fiberglass cloth to protect the plywood corner. Joint 30 can be used for all joints of a boat hull and deck, and for bulkheads and furnishings in the boat's interior.

Joint 30 has the further advantage of equivalent thickness and strength at all angles of fabrication, in contrast to both chine logs and fillets which typically decrease in thickness as the angle of joining become more obtuse (as in the forward portion of hull panels).

Viewing joints 30 as they run fore and aft in a boat hull, it can be appreciated that the joints create a rigid longitudinal frame that strengthens and reinforces the form of the boat. As mentioned above, where required this frame can be stiffened by adding reinforcements such as fiberglass or carbon fiber to the joint core compound which forms core 34.

The complication of building boat hulls with laminated half-panels 32A, 32B as used in the preferred embodiment of the instant invention is more than made up for by three factors. First, there is the additional strength and rigidity gained with this method because the shape of the hull is locked in by the lamination process and reinforced by epoxy. Second, thinner panels which are more easily handled and formed can be used for construction. This will also allow forming bends with greater curvature and complexity and thus more design flexibility. Third, and perhaps most important, the laminated half-panel construction allows for continuously variable angles in joint 30 (without, for example, hard-planing a varying chine log face) because panel patterns can be readily developed to correspond to the angles of joining (e.g., with large angles, interior half-panels increase in width relative to exterior panels).

A somewhat similar edge joint contemplated as being within the scope of the invention can be accomplished by simply cutting a deep "V" into a panel made of a single piece of plywood, but this would tend to lack some of the advantages described above and is not a preferred embodiment of applicant's novel joint edge invention.

METHOD OF FORMING THE NOVEL EDGE JOINT IN BOAT HULL CONSTRUCTION

The method of forming novel edge joint 30 can be effectively applied with plywood panel construction where the panels have been pre-cut to the exact shape required (e.g., using patterns, templates, or CAM techniques) and the edges to be jointed have been pre-beveled. Beveling is readily accomplished using a router, planer, joiner, or skill saw and an appropriate jig for setting the bevel.

A number of standard boat construction procedures can be utilized for holding the panels in position during bonding. Construction can be carried out, as an example, using a mold comprising a simple set of cross-section mold stations. The outer set of pre-cut half-panels would be temporarily attached to female mold stations (for a simple hull these panels would be the sides and floors of the hull temporarily attached to the mold stations with staples). All joints would then be coated and partially filled with epoxy. The first application of epoxy to the joint is aided by temporarily sealing-/completing the outside of the joint with masking tape. After the initial application of epoxy has set-up, the hull is rigid enough for the temporary fasteners to be removed. The inside of the outer half-panels are covered with epoxy and the inner set of half-panels is mated and held in place during set-up with temporary staples.

The solid interior core of the joint can be produced in several ways. The most straightforward technique on a simple hull is to apply the epoxy core material as a relatively thick bead along the course of the notch in the "V" on each side of the joint before the interior half panels are applied. The epoxy is then squeezed into the joint by the panels as they are placed into position. A small amount of excess epoxy is extruded into the inside of the joint which is readily smoothed and removed by running a trowel down the joint. Alternatively, epoxy can be injected into the joint after the inner panels have been positioned. The injection can be accomplished by masking the inside junctions and then placing small holes at intervals so that the tip of an injector can be inserted and a slurry of epoxy injected. Epoxy thickness can be controlled to permit use of either of these techniques or other variants. The dimensional stability of epoxy during the process of curing ensures that the joints will be solid with a minimum of voids. Also, precoating the plywood surface in the first stages serves to prevent problematic absorption of the epoxy into the edge grain later when the joint is filled.

The strength and filling properties of the epoxy permit considerable latitude in the actual mating of the plywood panels at the joint. There can be small overlaps or underlaps that are of little consequence because the epoxy is stronger than the wood. This forgiving feature of construction makes joint 30 particularly suited to the varying angles of attachment required for shaping the hulls of boats. Use of pre-cut panel shapes means that little further fitting, trimming, working, or finishing of the joint or boat hull is required.

TESTS OF THE EDGE JOINT

Various sizes of plywood panels have been used to construct samples of edge joint 30 described in detail above. Several sets of these samples have been compared in cantilever beam "failure" tests to traditional joints to confirm the strength of the internal joint, and the results are set forth in Table 1 below.

TABLE 1

Failure Tests of Joints
Using Cantilever Beam Test
(Values from two or more samples*)

| | Std. Joint w/chine log | Std. Joint w/epoxy fillet | Novel Joint [half-panels] | Std. Joint w/chine log [half-panels] | Std. Joint w/epoxy fillet [half-panels] |
|---|---|---|---|---|---|
| Force to Break (lbs.) | 18–22 109 | 16–21 | 37–40 | 38–41 | 36–40 |
| Location of failure | plywd. arm | plywd. arm | plywd. arm | plywd. arm | plywd. arm |

*Samples are all ¼" thick plywood made up from either ¼" plywood or laminated from two ⅛" half-panels. Ninety degree joints were formed from 1⅛" × 4¼" arms with the stress weight applied 3¼" from the joint.

When traditional joints constructed with single panels of plywood were subjected to increasing force, failure occurred just outside the joint in the plywood. That is, the joint was stronger than the plywood sheet itself. For the novel edge joint 30 method described herein, the breaking force required was higher than for such traditional joints when equivalent thickness panels were compared owing to increased strength provided by the half-panel lamination. More importantly, when these internal joints failed, the point of failure was also in the panel outside the joint (i.e., outside the "V"s). When traditional joints were constructed using half-panel laminates to equate for panel strength, failure occurred at a force equivalent to that for the novel joint and again occurred in the panel outside the joint. Thus, for both traditional joints as well as for novel joint 30 described herein, the joint strength is greater than the strength of the panels themselves and is not a limiting factor in boat hull construction.

Applicant would like to note that although much emphasis herein has been placed on use of novel edge joint 30 in boat construction, applicant contemplates broader applications thereof (including furniture manufacture) and thus the description hereinabove in terms primarily of boat construction is merely for the purpose of convenience. Also, although the cementitious material described in the detailed specification above is epoxy, applicant wishes to note that any dimensionally stable cementitious material is contemplated as within the scope of the present invention.

Although the detailed specification set forth above emphasizes formation of novel edge joint 30 with two bilaminated sheets of plywood, applicant contemplates that the novel edge joint may be formed from other materials including sheet plastics as well as bilaminated sheet plastics. Moreover, applicant contemplates that the sheet plastics could be formed with a plastic outside half-panel laminated to a wood interior half-panel. Finally, although the detailed specification set forth above emphasizes formation of novel edge joint 30 with bilaminated sheets, applicant contemplates that the novel edge joint may be formed from multi-laminate panels where a thicker panel is required and where internal laminates would project additional beveled legs into the epoxy core.

It will be understood that various details of the invention may be changed without departing from the scope of the invention. Furthermore, the foregoing description is for the purpose of illustration only, and not for the purpose of limitation—the invention being defined by the claims.

What is claimed is:

1. A high strength non-externally reinforced edge joint with a protected corner comprising at least two panels positioned together so that said panels intersect at an angle varying over the length of the intersection from about 60°–170°, said panels each defining a V-shaped groove having first and second spaced-apart legs along one side thereof wherein said first legs of said V-shaped grooves are in contact one with the other so as to form said variable angle and the second legs of said grooves are spaced-apart one from the other so as to form an open cavity at the juncture of said panels which is defined by the grooves within said adjacent panels and the open space between said second legs of said grooves, and a cementitious material filling said cavity to form said edge joint and protected corner thereof.

2. A high strength non-externally reinforced edge joint with a protected corner according to claim 1 wherein sad two panels comprise two plywood panels.

3. A high strength non-externally reinforced edge joint with a protected corner according to claim 2 wherein said two plywood panels each comprises a 2 ply laminated plywood sheet.

4. A high strength non-externally reinforced edge joint with a protected corner according to claim 1 wherein said two panels comprise two plastic panels.

5. A high strength non-externally reinforced edge joint with a protected corner according to claim 4 wherein said two plastic panels each comprises a 2 ply laminated plastic sheet.

6. A high strength non-externally reinforced edge joint with a protected corner according to claim 1 wherein said cementitious material comprises epoxy.

7. A high strength non-externally reinforced edge joint with a protected corner according to claim 1 wherein said edge joint is a boat construction joint.

8. A high strength non-externally reinforced edge joint with a protected corner according to claim 1 wherein said edge joint is a furniture construction joint.

9. A high strength non-externally reinforced wooded boat edge joint with a protected corner comprising:

at least two 2 ply laminated panels positioned together so that said panels intersect at an angle varying over the length of the intersection from about 60°–170°, said panels each defining a V-shaped groove having first and second spaced-apart legs along one side thereof wherein said first legs of said V-shaped grooves are in contact one with the other so as to form said variable angle and the second legs of said grooves are spaced-apart one from the other so as to form an open cavity at the juncture of said panels which is defined by the grooves within said adjacent panels and the open space between said second legs of said grooves, and an epoxy cement filling said cavity to form said edge joint and protected corner thereof.

10. A method for making a high strength and non-externally reinforced edge joint with a protected corner comprising the steps of:

providing at least two edge joint panels wherein each of said panels defined a V-shaped groove having first and second spaced-apart legs along one side thereof;

positioning said at least two edge join panels in abutting relationship wherein said panels intersect at an angle varying over the length of the intersection from about 60°–170° and wherein said first legs of said V-shaped grooves are in contact one with the other so as to form said varying angle and the second legs of said grooves are spaced apart one from the other so as to form an open cavity at the juncture of said panels which is defined by the grooves within said adjacent panels and the open space between said second legs of said grooves; and filling said cavity with a cementitious material to form said edge joint and protected corner thereof.

11. A method of making a high strength non-externally reinforced edge joint with a protected corner according to claim 10 wherein said two panels comprise two plywood panels.

12. A method of making a high strength non-externally reinforced edge joint with a protected corner according to claim 11 wherein said two plywood panels each comprises a 2 ply laminated plywood sheet.

13. A method of making a high strength non-externally reinforced edge joint with a protected corner according to claim 10 wherein said two panels comprise two plastic panels.

14. A method of making a high strength non-externally reinforced edge joint with a protected corner according to claim 13 wherein said two plastic panels each comprises a 2 ply laminated plastic sheet.

15. A method of making a high strength non-externally reinforced edge joint with a protected corner according to claim 10 wherein said cementitious material comprises epoxy.

16. A method of making a high strength non-externally reinforced edge joint with a protected corner according to claim 10 wherein said edge joint is a boat construction joint.

17. A method of making a high strength non-externally reinforced edge joint with a protected corner according to claim 10 wherein said edge joint is a furniture construction joint.

18. A method for making a high strength and non-externally reinforced edge joint comprising the steps of:

providing at least two 2 ply laminated plywood panels wherein each of said panels defines a V-shaped groove having first and second spaced-apart legs along one side thereof;

positioning said at least two 2 ply laminated plywood panels in abutting relationship wherein said panels intersect at an angle varying over the length of the intersection from about 60°–170° and wherein said first legs of said V-shaped grooves are in contact one with the other so as to form said varying angle and the second legs of said grooves are spaced apart one from the other so as to form an open cavity at the juncture of said panels which is defied by the grooves within said adjacent panels and the open spaced between said second legs of said grooves; and filling said cavity with an epoxy cement to form said edge join and protected corner thereof.

19. A method for making a high strength and non-externally reinforced edge joint according to claim 18 wherein said V-shaped grooves are beveled inwardly into said panels at an 8:1 ratio.

* * * * *